(12) United States Patent
Bharti et al.

(10) Patent No.: US 10,810,608 B2
(45) Date of Patent: Oct. 20, 2020

(54) API PRICING BASED ON RELATIVE VALUE OF API FOR ITS CONSUMERS

(71) Applicant: International Business Machines Corporation, Armonk, NY (US)

(72) Inventors: Harish Bharti, Pune (IN); Amol Dhondse, Kothrud (IN); Abhay Patra, Pune (IN); Anand Pikle, Pune (IN); Rajesh Kumar Saxena, Mumbai (IN)

(73) Assignee: International Business Machines Corporatior, Armonk, NY (US)

( * ) Notice: Subject to any disclaimer, the term of this patent is extended or adjusted under 35 U.S.C. 154(b) by 292 days.

(21) Appl. No.: 15/898,925

(22) Filed: Feb. 19, 2018

(65) Prior Publication Data
US 2019/0259047 A1    Aug. 22, 2019

(51) Int. Cl.
*G06Q 30/02* (2012.01)
*G06F 9/54* (2006.01)
*G06N 20/00* (2019.01)

(52) U.S. Cl.
CPC ......... *G06Q 30/0206* (2013.01); *G06F 9/547* (2013.01); *G06N 20/00* (2019.01); *G06Q 30/0201* (2013.01); *G06Q 30/0204* (2013.01)

(58) Field of Classification Search
CPC .......... G06Q 30/0206; G06Q 30/0204; G06Q 30/0201; G06F 9/547; G06F 11/3003; G06N 20/00
See application file for complete search history.

(56) References Cited

U.S. PATENT DOCUMENTS

| 10,203,938 B2 * | 2/2019 | Bijani | G06F 8/34 |
| 2015/0254701 A1 * | 9/2015 | Laredo | G06Q 30/0283 705/80 |

(Continued)

OTHER PUBLICATIONS

Jennifer Riggins, "Top 5 API Monetization Models | API Business Models," https://nordicapis.com/top-5-apimonetization-business-models, Mar. 26, 2015, pp. 1-12.

(Continued)

*Primary Examiner* — Matthew S Gart
*Assistant Examiner* — Stephen S Swartz
(74) *Attorney, Agent, or Firm* — Robert A. Voigt, Jr.; Winstead PC (57) ABSTRACT

A method, system and computer program product for determining API pricing. Consumption parameters are identified using a supervised learning model. The API consumption parameters refer to any parameters that can be used to describe an API (functionality or otherwise) and can be used to compare other comparable APIs in similar domains provided by other providers. Furthermore, reference pricing is determined using machine learning using the identified API consumption parameters. Additionally, the API price is determined dynamically using the identified API consumption parameters and the determined reference pricing. An API pricing score is then derived for the API price using the supervised learning model. The API price is selected as the suggested price for the API in response to the API pricing score exceeding a threshold value. In this manner, an API price is established that reflects the true value of the API assessed by the API consumer.

16 Claims, 9 Drawing Sheets

(56) References Cited

U.S. PATENT DOCUMENTS

2016/0092897 A1* 3/2016 Natarajan .......... G06Q 30/0206
            705/7.35
2016/0225042 A1* 8/2016 Tran ................... G06F 11/3006
2016/0292018 A1* 10/2016 Laredo ...................... G06F 9/54

OTHER PUBLICATIONS

Quora, "APIs: What are the various pricing models?" https://www.quora.com/APIs-What-are-the-various-pricingmodels, Apr. 2012, pp. 1-3.

TIBCO Software Inc., "Plans & Pricing | TIBCO Mashery," https://www.mashery.com/api/products, 2016, pp. 1-4.

Guven et al., "Beyond the Cost Model: Understanding Price Elasticity and Its Applications," https://www.casactorg/pubs/forum/13spforum/Guven_McPhail.pdf, CAS E-Forum, Mar. 2013, pp. 1-29.

Allon et al., "Price Competition under Multinomial Logit Demand Functions with Random Coefficients," http://www.hbs.edu/faculty/Publication%20Files/12-030.pdf, Oct. 27, 2011, pp. 1-27.

Unknown, "Basic Price Optimization," https://www.utdallas.edu/~metin/Or6377/Folios/basicpro.pdf, 2016, pp. 1-52.

Gallego et al., "Multi-Product Price Optimization and Competition under the Nested Logit Model with Product-Differentiated Price Sensitivities," http://www.columbia.edu/~gmg2/nestedpricing.pdf, Aug. 1, 2013, pp. 1-28.

List of IBM Patents or Patent Applications Treated as Related, Jun. 17, 2019, pp. 1-2.

Office Action for U.S. Appl. No. 16/442,034 dated Feb. 21, 2020, pp. 1-45.

* cited by examiner

| $X_i$ | Acronym | Predictor Variable | Ranking Meter |
|---|---|---|---|
| $X_1$ | AFVI | API function volatility index | Between 0 and 100 |
| $X_2$ | ES | Efficiency scoring | Between 0 and 100 as measure of their API quality over time. |
| $X_3$ | MA | Availability in the market | Moving average of participation in last 10 API functions with 1 as yes and 0 as no |
| $X_4$ | Re | Relevance | In %, Construed as the API production uptime |
| $X_5$ | Lat | Latency | Data latency being observed as a functional dimension |
| $X_6$ | Acc | Accuracy | In % of the errors not being able to fulfil in given software licensing agreement |
| $X_7$ | LAM | Liquidity in the API Market | $\dfrac{(P_a - P_b)}{(P_a + P_{b/2})}$ |
| | | | $P_a$ is maximum ask price, $P_b$ is mimimum API function price |
| $X_8$ | FOS | API function-offer spread | Defined as Average (P-C) over all n API functions |
| $X_9$ | CR | churn ratio | As %, Abs{log(p(P)/(1-p(P)))} |
| $X_{10}$ | Disc | Discounts applicable | Yes / No as indicated as 1 or 0 |
| $X_{11}$ | RR | Rate recover | Yes / No as indicated as 1 or 0 |

FIG. 8

| Comparative Benchmarking | Target API | Reference API 1 | Reference API 2 | Reference API 3 |
|---|---|---|---|---|
| API Name | getEquipmentHealthInfo | getAssetConditionInfo | getEquipmentConditionInfo | getAssetHealthInfo |
| Standard | IEC CIM | Open Standard | IEC CIM, Capability Model | IBM |

FIG. 9

| API Feature Profile Comparison | | | | |
|---|---|---|---|---|
| API Feature | Target API | Reference API 1 | Reference API 2 | Reference API 3 |
| Data Accuracy ($X_1$) | Medium | Medium | High | High |
| API Availability ($X_2$) | High | High | Medium | Medium |
| Granularity - by Time ($X_3$) | Aggregated Hourly | Aggregated 15 minutes | Aggregated Hourly | Aggregated 30 minutes |
| Granularity - by Location ($X_4$) | Aggregated at Site level | Individual / Atomic | Aggregated by Post Code | Aggregated at Site level |
| Granularity - by Subject ($X_5$) | Medium | Medium | High | High |
| Completeness - by Time ($X_6$) | 24/7 | 8am-8pm/7 | 8am-8pm/7 | 16/6 |
| Completeness - by Location ($X_7$) | 91% | 90% | 92% | 88% |
| Completeness - by Subject ($X_8$) | Comprehensive | Sparse | Comprehensive | Comprehensive |
| Latency ($X_9$) | 1-2 Hours | 15 Minutes | Day - 1 | 30-60 Minutes |
| Process Relevance ($X_{10}$) | High | Medium | Medium | High |
| . | | | | |
| . | | | | |
| $X_n$ | | | | |

FIG. 10

API PRICING BASED ON RELATIVE VALUE OF API FOR ITS CONSUMERS

TECHNICAL FIELD

The present invention relates generally to application programming interface (API) pricing, and more particularly to determining API pricing based on the relative value of the API for its consumers by performing cognitive analysis of the API parameters from different API providers.

BACKGROUND

An application programming interface (API) is code that allows two software programs to communicate with each other. The API defines the correct way for a developer to write a program that requests services from an operating system (OS) or other application.

APIs allow enterprises to share information and interact with other enterprises in an effective way. Over the last few years, there has been a huge increase in the information shared, such as enterprise data, mobile data and social data, among API consumers. However, the price of using such APIs is important to API consumers, and if the price is too high, then consumption of APIs may decline despite the investment made by API providers.

Currently, pricing of APIs (API pricing) is based on expected revenue and the expected number of users and transactions, which are speculative, and may not accurately reflect the true value of the API to the consumer. Furthermore, since the pricing of APIs is based on speculative information, API pricing systems exhibit high utilization of computing resources, such as processing resources, in deriving a price to charge for an API.

Furthermore, current models of API pricing charge an upfront amount or recover that amount over a period of time without taking into account where the API stands in terms of the capabilities offered and the quality of data with respect to other similar APIs from other API providers.

Hence, the API price may not reflect the true value of the API to the consumer. That is, there is not currently a means for establishing an API price that is commensurate with the value assessed by the API consumer. By not establishing an API price that is commensurate with the value assessed by the API consumer, an excessive amount of computing resources are utilized by the API pricing system in attempting to derive a price to charge for an API that would be acceptable to the API consumer.

SUMMARY

In one embodiment of the present invention, a method for determining API pricing comprises identifying application programming interface (API) consumption parameters of an API using a supervised learning model. The method further comprises determining, by a processor, reference pricing using machine learning using the identified API consumption parameters. The method additionally comprises determining, by the processor, an API price using the identified API consumption parameters and the determined reference pricing. Furthermore, the method comprises deriving, by the processor, an API pricing score for the determined API price. Additionally, the method comprises selecting, by the processor, the API price as a suggested price for the API in response to the API pricing score exceeding a threshold value.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product for determining API pricing. In one embodiment of the present invention, an application programming interface (API) pricing mechanism identifies consumption parameters using a supervised learning model. The API consumption parameters refer to any parameters that can be used to describe an API (functionality or otherwise) and can be used to compare other comparable APIs in similar domains provided by other providers. Examples of such API consumption parameters include attributes (e.g., time, location, products, users, quality benchmarking), availability, quality of profile-specific information, functional dimensions (e.g., relevance, granularity, completeness, accuracy, time of event), non-functional dimensions (e.g., data latency, availability for a given data category), and topic (e.g., demographic profile, travel preferences). The API pricing mechanism determines the reference pricing using machine learning using the identified API consumption parameters. "Reference pricing," as used herein, refers to competitive pricing, where the API is priced at just below the price of a competitor's API or at a discount in comparison to a previous price. Furthermore, the API pricing mechanism determines the API price dynamically, such as for rate and slabs, using the identified API consumption parameters and the determined reference pricing. An API pricing score is then derived for the API price using the supervised learning model of the present invention. The API price is selected as the suggested price for the API in response to the API pricing score exceeding a threshold value. In this manner, an API price is established that reflects the true value of the API assessed by the API consumer. The computer capabilities of API pricing systems are improved since fewer computing resources need to be utilized in determining the API price that is commensurate with the value assessed by the API consumer.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
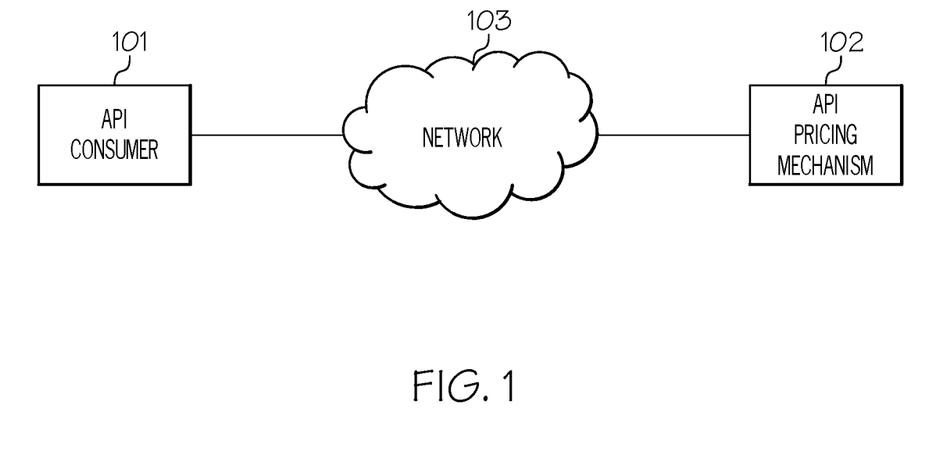
FIG. 1 illustrates an API pricing system configured in accordance with an embodiment of the present invention.

Referring now to the Figures in detail, FIG. 1 illustrates an API pricing system 100 configured in accordance with an embodiment of the present invention. API pricing system 100 includes an API consumer 101 connected to an API pricing mechanism 102 via a network 103. API consumer 101 refers to a user, such as a developer, a partner or an end user, that utilizes the API built by an API team. API consumer 101, as used herein, may also refer to the computing device (e.g., portable computing unit, Personal Digital Assistant (PDA), smartphone, laptop computer, mobile phone, navigation device, game console, desktop computer system, workstation, Internet appliance and the like) utilized by the API consumer.

In one embodiment, API pricing mechanism 102 is configured to generate an API price that reflects the true value of the API assessed by the consumer (e.g., API consumer 101). That is, API pricing mechanism 102 is configured to establish an API price that is commensurate with the value assessed by API consumer 101. In one embodiment, API pricing mechanism 102 determines the API price using a probability function (e.g., machine learning logistic function) with the ability to dynamically adjust the API consumption parameters using supervised learning models as discussed in further detail below. A description of an embodiment of a hardware configuration of API pricing mechanism 102 is provided below in connection with FIG. 2.

Network 103 may be, for example, a wireless wide area network, a Global System for Mobile Communications (GSM) network, a Wireless Application Protocol (WAP) network, a WiFi network, an IEEE 802.11 standards network, various combinations thereof, etc. Other networks, whose descriptions are omitted here for brevity, may also be used in conjunction with system 100 of FIG. 1 without departing from the scope of the present invention.

System 100 is not to be limited in scope to any one particular network architecture. System 100 may include any number of API consumers 101, API pricing mechanisms 102 and networks 103.

Figure 2:
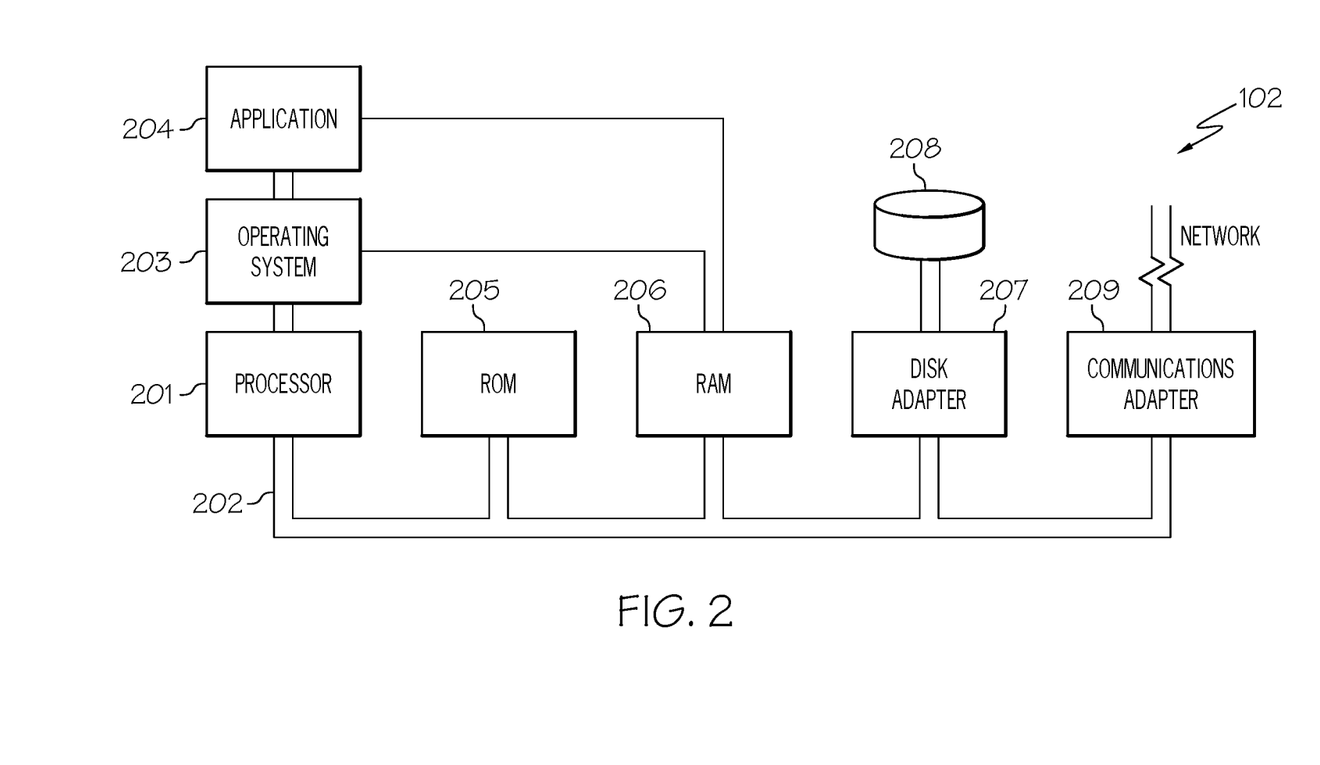
FIG. 2 illustrates an embodiment of the present invention of a hardware configuration of the API pricing mechanism which is representative of a hardware environment for practicing the present invention.

Referring now to FIG. 2, FIG. 2 illustrates a hardware configuration of API pricing mechanism 102 (FIG. 1) which is representative of a hardware environment for practicing the present invention. Referring to FIG. 2, API pricing mechanism 102 has a processor 201 coupled to various other components by system bus 202. An operating system 203 runs on processor 201 and provides control and coordinates the functions of the various components of FIG. 2. An application 204 in accordance with the principles of the present invention runs in conjunction with operating system 203 and provides calls to operating system 203 where the calls implement the various functions or services to be performed by application 204. Application 204 may include, for example, a program for determining API pricing based on the relative value of the API for its consumers as discussed further below in connection with FIGS. 3-10.

Referring again to FIG. 2, read-only memory ("ROM") 205 is coupled to system bus 202 and includes a basic input/output system ("BIOS") that controls certain basic functions of API pricing mechanism 102. Random access memory ("RAM") 206 and disk adapter 207 are also coupled to system bus 202. It should be noted that software components including operating system 203 and application 204 may be loaded into RAM 206, which may be API pricing mechanism's 102 main memory for execution. Disk adapter 207 may be an integrated drive electronics ("IDE") adapter that communicates with a disk unit 208, e.g., disk drive. It is noted that the program for determining API pricing based on the relative value of the API for its consumers, as discussed further below in connection with FIGS. 3-10, may reside in disk unit 208 or in application 204.

API pricing mechanism 102 further includes a communications adapter 209 coupled to bus 202. Communications adapter 209 interconnects bus 202 with an outside network (e.g., network 103 of FIG. 1) thereby allowing API pricing mechanism 102 to communicate with other devices, such as API consumer 101.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As stated in the Background section, currently, pricing of APIs (API pricing) is based on expected revenue and the expected number of users and transactions, which are speculative, and may not accurately reflect the true value of the API to the consumer. Furthermore, since the pricing of APIs is based on speculative information, API pricing systems exhibit high utilization of computing resources, such as processing resources, in deriving a price to charge for an API. Furthermore, current models of API pricing charge an upfront amount or recover that amount over a period of time without taking into account where the API stands in terms of the capabilities offered and the quality of data with respect to other similar APIs from other API providers. Hence, the API price may not reflect the true value of the API to the consumer. That is, there is not currently a means for establishing an API price that is commensurate with the value assessed by the API consumer. By not establishing an API price that is commensurate with the value assessed by the API consumer, an excessive amount of computing resources are utilized by the API pricing system in attempting to derive a price to charge for an API that would be acceptable to the API consumer.

Figure 3:
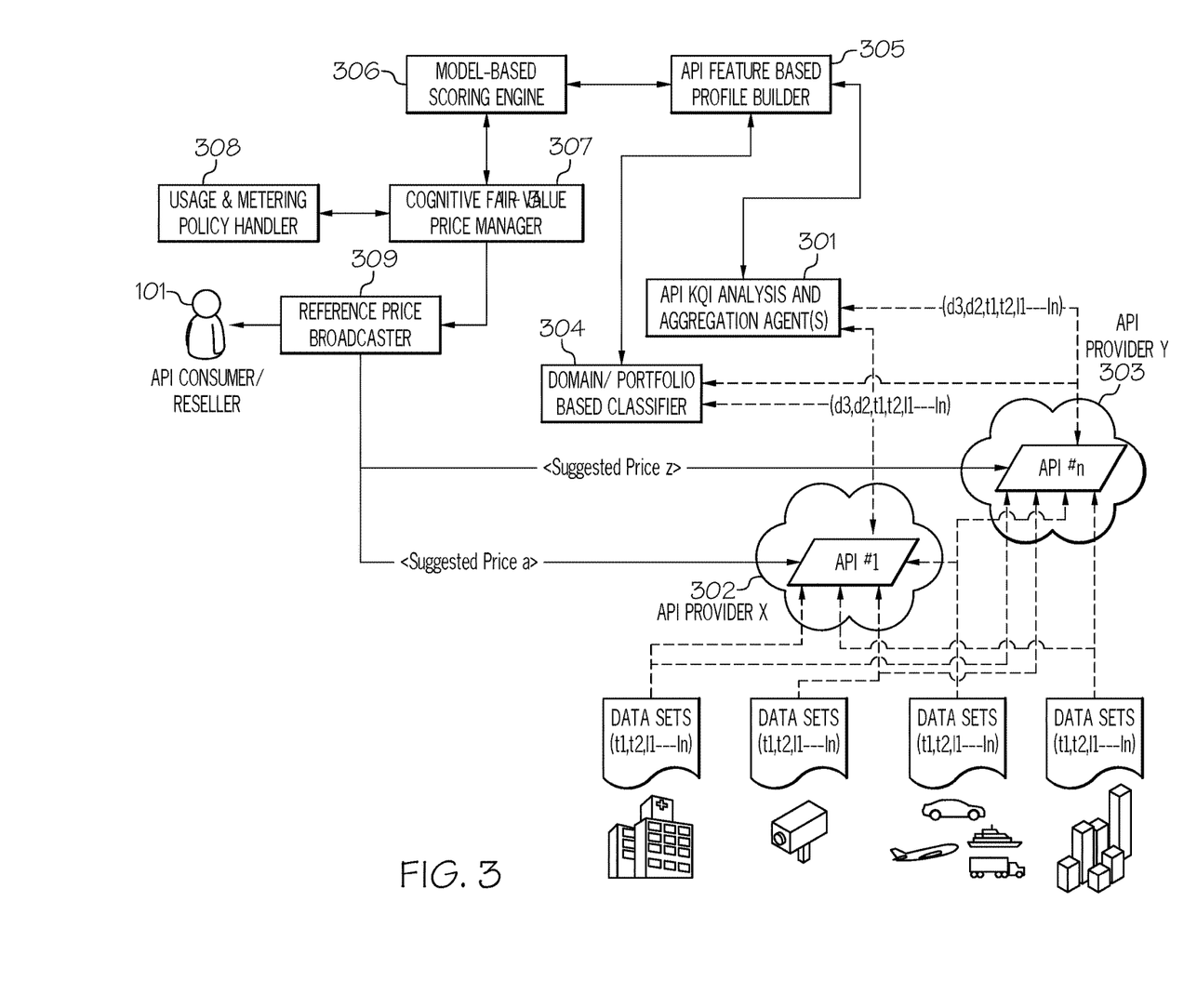
FIG. 3 is a diagram of the software components of the API pricing mechanism in accordance with an embodiment of the present invention.
Figure 4:
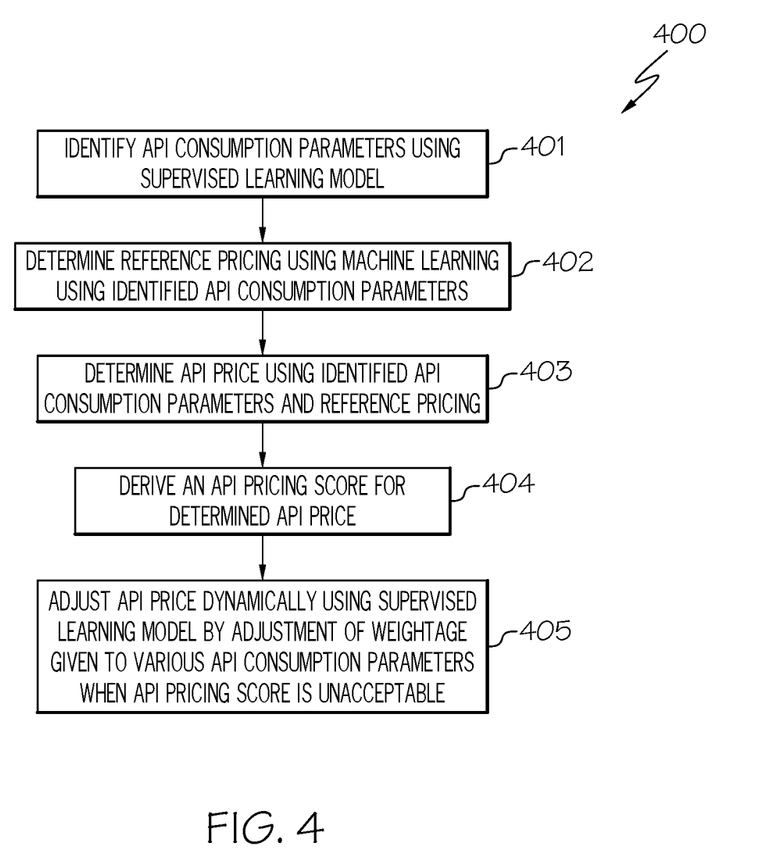
FIG. 4 is a flowchart of a method for dynamically adjusting charging parameters in accordance with an embodiment of the present invention.
Figure 5:
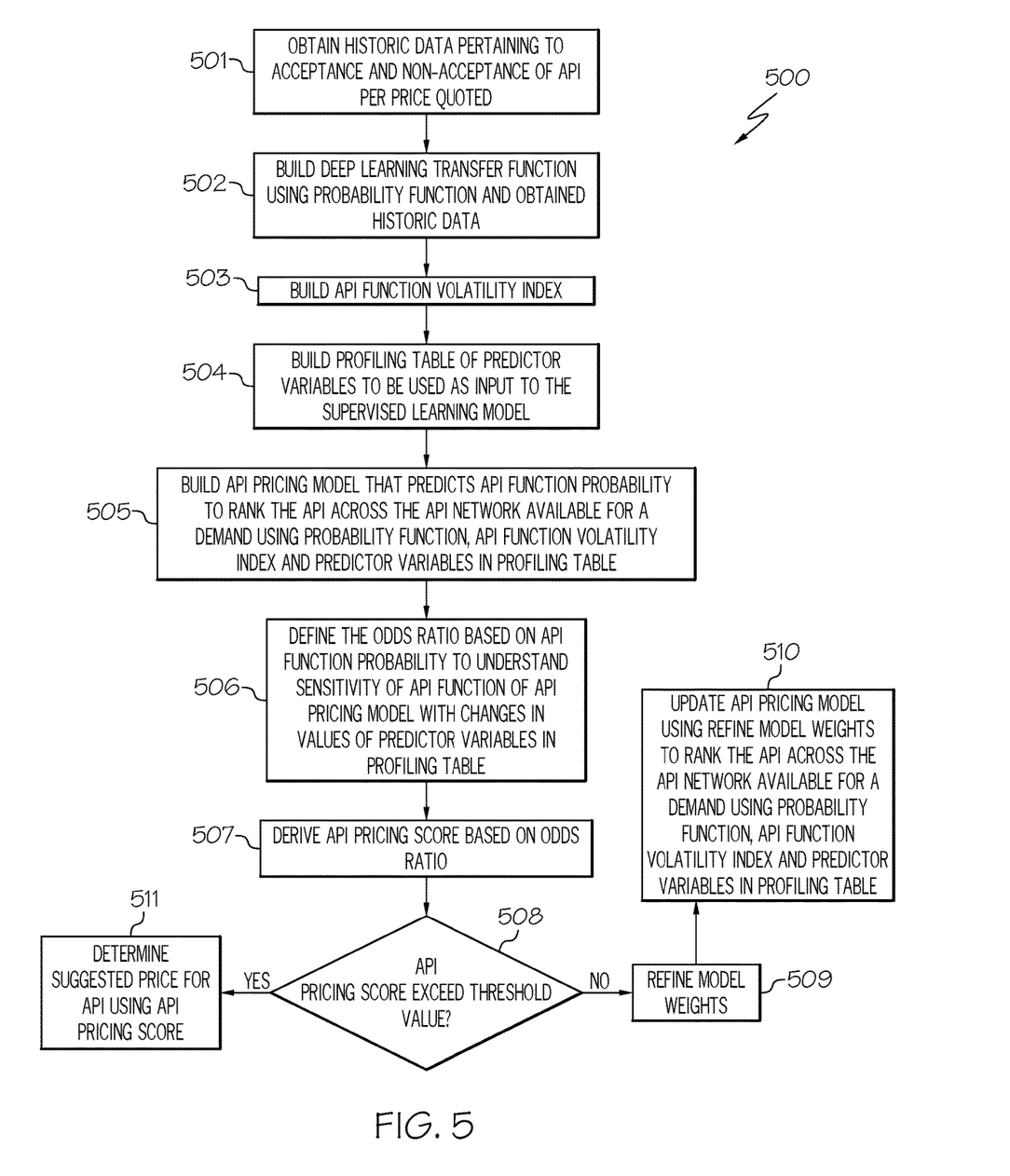
FIG. 5 is a flowchart of a method for deriving an API pricing score so as to determine a suggested API price in accordance with an embodiment of the present invention.
Figure 6:
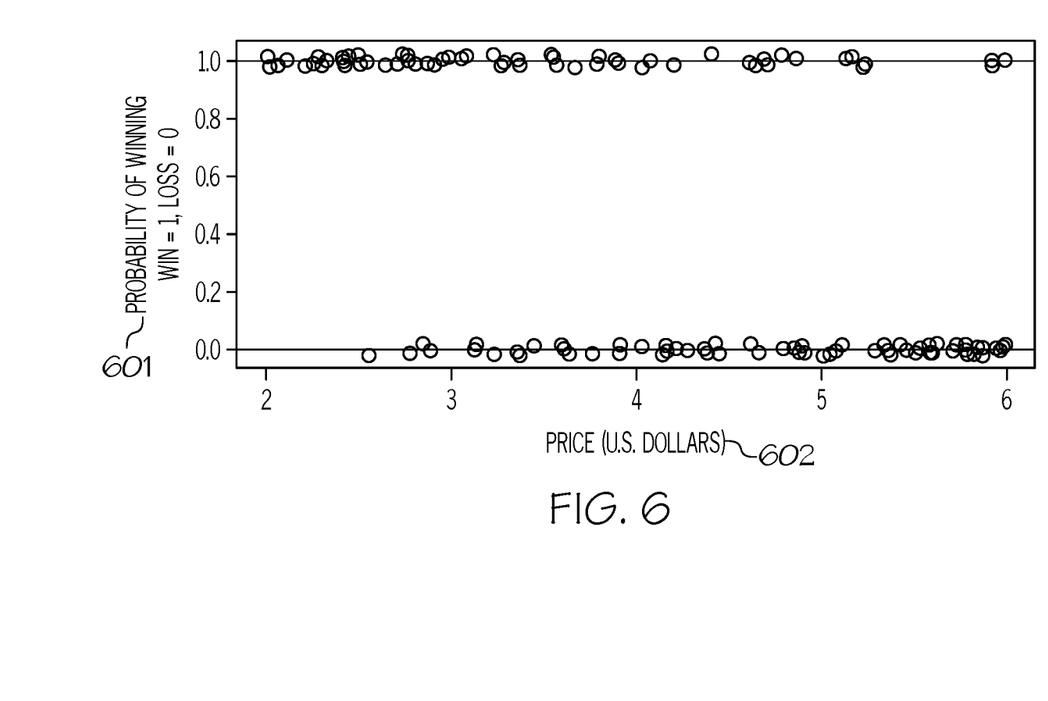
FIG. 6 illustrates an exemplary graph showing the historic data for win/loss (i.e., acceptance and non-acceptance) of the API per price quoted in accordance with an embodiment of the present invention.
Figure 7:
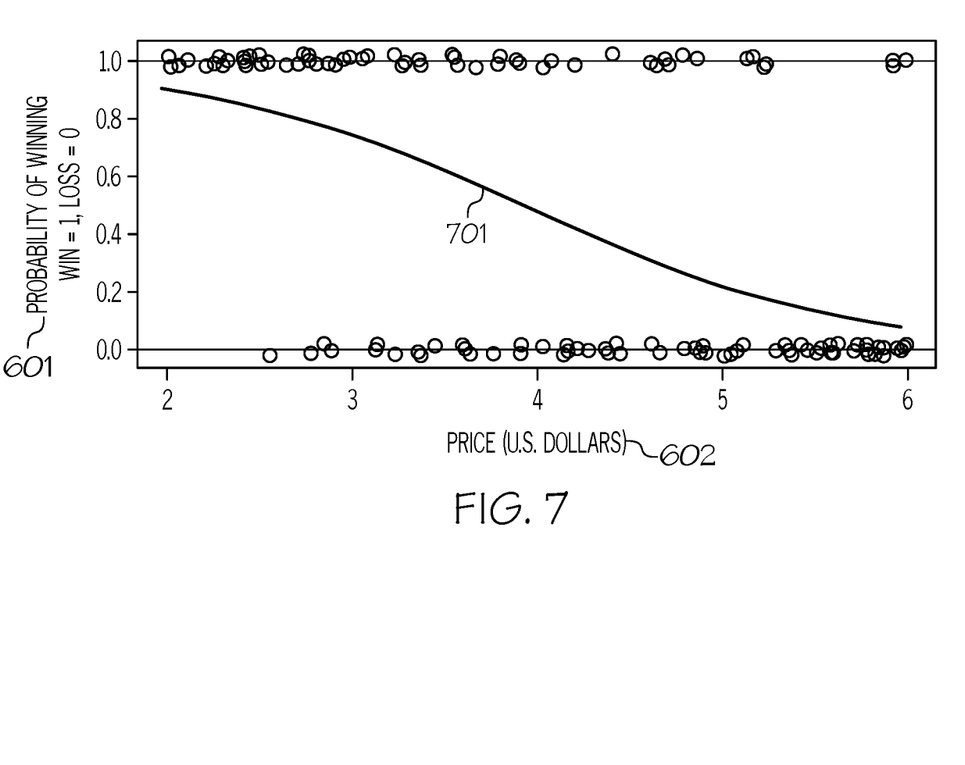
FIG. 7 illustrates an exemplary graph showing that the probability function utilized is the logistic function that is inverse S-shaped in accordance with an embodiment of the present invention.
Figure 8:
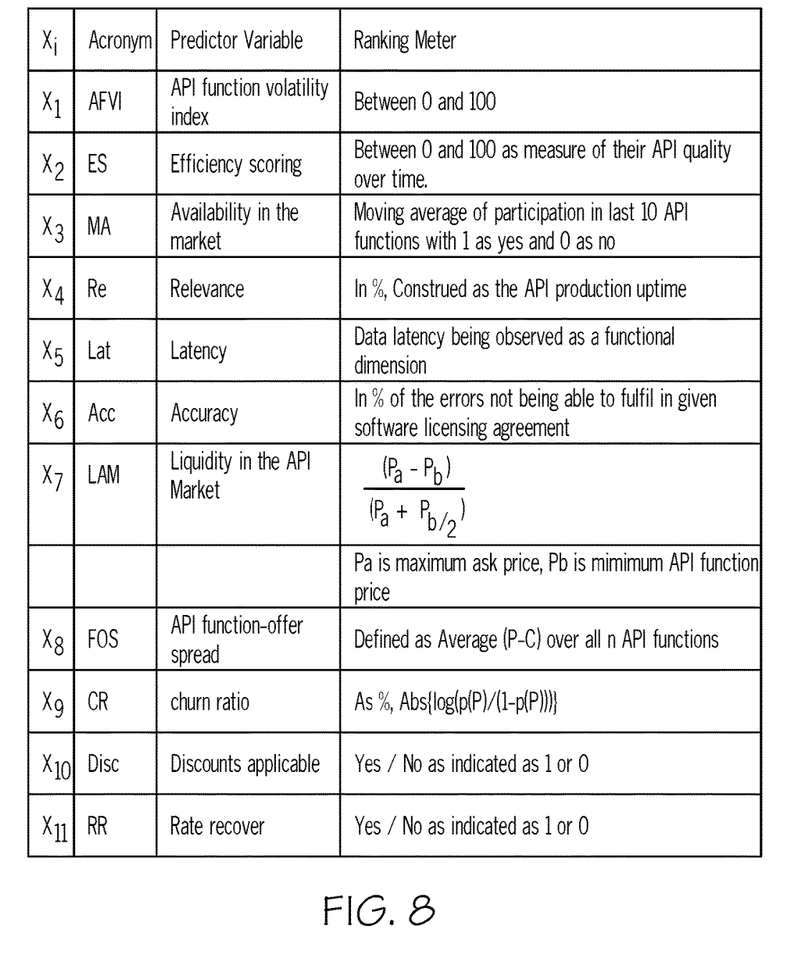
FIG. 8 illustrates an exemplary profiling table in accordance with an embodiment of the present invention.
Figure 9:
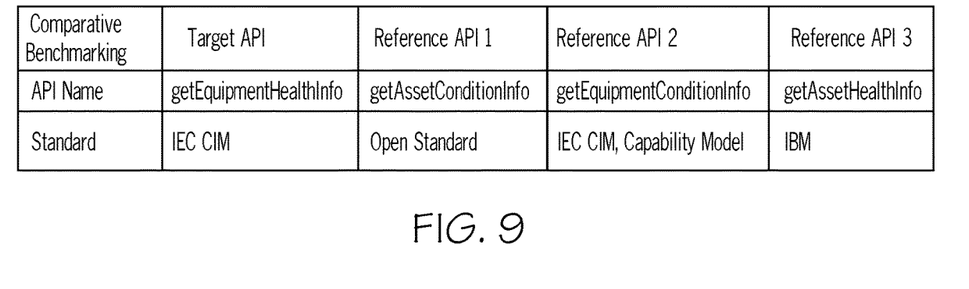
FIG. 9 is a table illustrating an example where the pricing model is based on the quality of functional and non-functional parameters of the target API relative to the referenced APIs providing similar function/data in accordance with an embodiment of the present invention.
Figure 10:
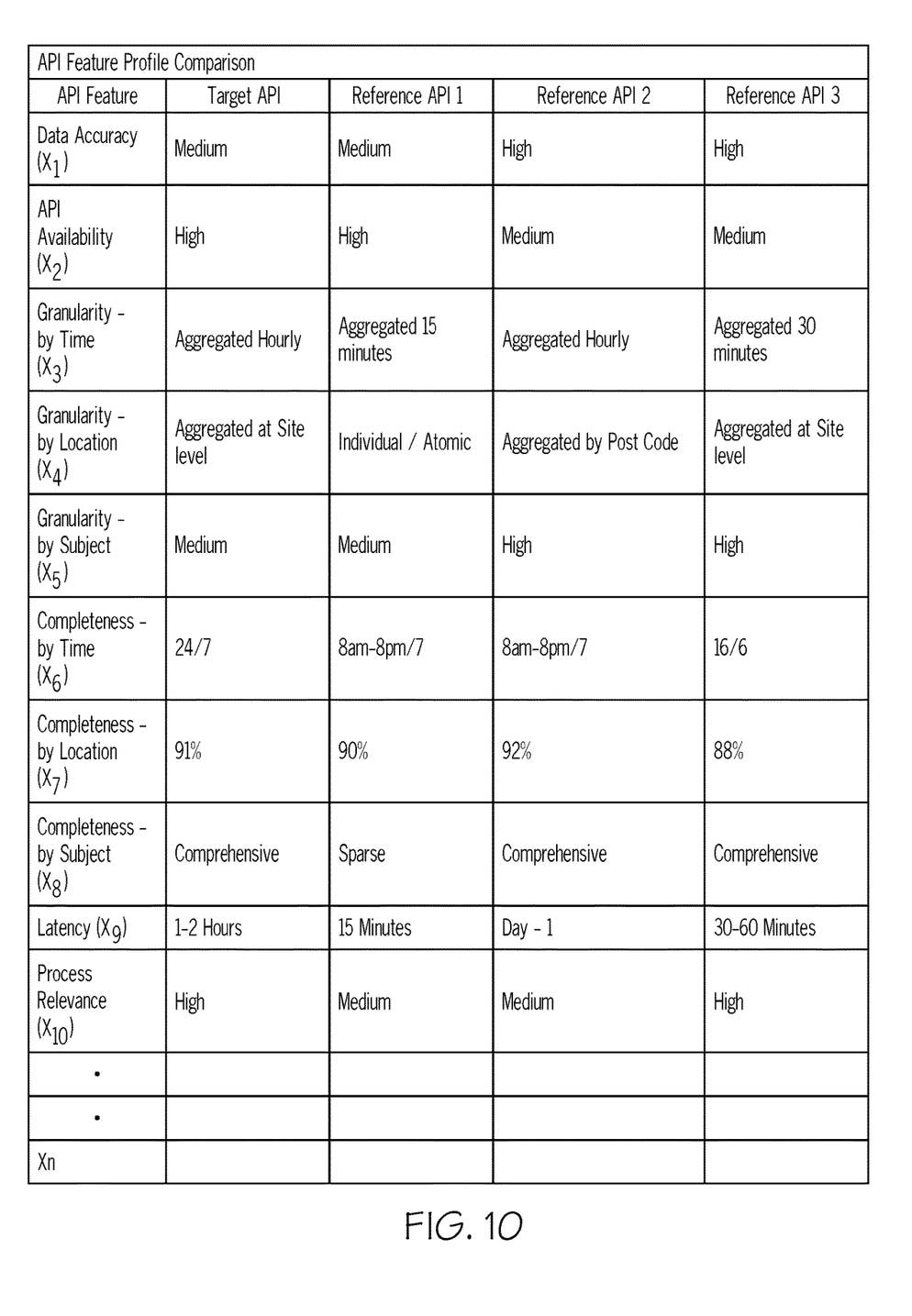
FIG. 10 is a table illustrating an example of comparing the API features between the target API and the referenced APIs in accordance with an embodiment of the present invention.

The principles of the present invention provide a means for establishing an API price that reflects the true value of the API assessed by the consumer using a probability function (e.g., machine learning logistic function) with the ability to dynamically adjust the API consumption parameters using supervised learning models as discussed below in connection with FIGS. 3-10. FIG. 3 is a diagram of the software components of the API pricing mechanism. FIG. 4 is a flowchart of a method for dynamically adjusting charging parameters. FIG. 5 is a flowchart of a method for deriving an API pricing score so as to determine a suggested API price. FIG. 6 illustrates an exemplary graph showing the historic data for win/loss (i.e., acceptance and non-acceptance) of the API per price quoted. FIG. 7 illustrates an exemplary graph showing that the probability function utilized is the logistic function that is inverse S-shaped. FIG. 8 illustrates an exemplary profiling table. FIG. 9 is a table illustrating an example where the pricing model is based on the quality of functional and non-functional parameters of the target API relative to the referenced APIs providing similar function/data. FIG. 10 is a table illustrating an example of comparing the API features between the target API and the referenced APIs.

As stated above, FIG. 3 is a diagram of the software components of API pricing mechanism 102 in accordance with an embodiment of the present invention. In one embodiment, these software components may reside in application 204 (FIG. 2) of API pricing mechanism 102.

The following provides a brief description of these software components. A more detailed description of these software components (including their functionalities) is provided below in conjunction with FIGS. 4-10.

Referring to FIG. 3, in conjunction with FIGS. 1-2, API pricing mechanism 102 utilizes API key quality indicator (KQI) analysis and aggregation agent(s) 301 configured to identify and extract API features based on design-time and run-time input (e.g., data sets as shown in FIG. 3). In one embodiment, such agents are API provider-specific. Furthermore, API key quality indicator (KQI) analysis and aggregation agent(s) 301 are configured to aggregate features across comparable APIs provided by different providers, such as API provider X 302 (providing API #1) and API provider Y 303 (providing API #n).

Additionally, API pricing mechanism 102 utilizes domain/portfolio based classifier 304 configured to perform API mapping to the API class/parent node within the portfolio based on natural language classification (NLC), feature-to-class mapping, entity extraction, etc.

Furthermore, API pricing mechanism 102 utilizes API feature based profile builder 305 configured to perform API feature mapping using NLC, feature mapping, entity relationship mapping, etc. Additionally, API feature based profile builder 305 is configured to build the API feature profile which determines the input variables to the supervised learning model of the present invention.

Additionally, API pricing mechanism 102 utilizes model-based scoring engine 306 which is responsible for training the model based on domain and expert input, which iteratively refines the relative weightage of each API consumption parameter based on continuous feedback for a given consumer and business process context. Furthermore, model-based scoring engine 306 performs run-time model evaluation to determine the API pricing score(s).

Furthermore, API pricing mechanism 102 utilizes cognitive fair value price manager 307 configured to determine the suggested API price based on inputs from model-based scoring engine 306 and the usage and metering policy handler 308. In one embodiment, usage and metering policy handler 308 is configured to validate the data, such as usage and metered data, against policies established by API consumer 101.

Additionally, API pricing mechanism 102 utilizes reference price broadcaster 309 configured to publish the suggested price, which can be referenced by API consumers 101 (including providers, such as API providers 302, 303).

A more detailed description of the software components (including their functionalities) of API pricing mechanism 102 is provided below in conjunction with FIG. 4.

FIG. 4 is a flowchart of a method 400 for dynamically adjusting charging parameters (e.g., rate, price slabs, discounts) in accordance with an embodiment of the present invention.

Referring to FIG. 4, in conjunction with FIGS. 1-3, in step 401, API pricing mechanism 102 identifies the API consumption parameters using a supervised learning model. API consumption parameters refer to any parameters that can be used to describe an API (functionality or otherwise) and can be used to compare other comparable APIs in similar domains provided by other providers. Examples of such API consumption parameters include attributes (e.g., time, location, products, users, quality benchmarking), availability, quality of profile-specific information, functional dimensions (e.g., relevance, granularity, completeness, accuracy, time of event), non-functional dimensions (e.g., data latency, availability for a given data category), and topic (e.g., demographic profile, travel preferences). These and other examples of such API consumption parameters will be provided below throughout the discussion of methods 400, 500.

In one embodiment, the supervised learning model of the present invention uses machine learning to infer a function based on training data provided by an expert, such as an expert in API pricing. The training data may include input and output variables related to the API consumption parameters. An algorithm is then used to learn the mapping function from the input to the output so that one can predict the output variables for new input data. A further description of the supervised learning model is provided below.

In one embodiment, a taxonomy that classifies the API is built by API pricing mechanism 102. Such classification may include various parameters of the API, such as API consumption parameters, that are represented as nodes in the taxonomy.

In step 402, API pricing mechanism 102 determine the reference pricing using machine learning using the identified API consumption parameters. "Reference pricing," as used herein, refers to competitive pricing, where the API is priced at just below the price of a competitor's API or at a discount in comparison to a previous price. In one embodiment, reference pricing is determined using machine learning to determine the API context. In one embodiment, API pricing mechanism 102 determines the reference pricing by using natural language processing based on the cognitive analysis of the datasets returned by the API across the following attributes: time, location, products, users and other such variables, and quality-benchmarking the API in comparison to other APIs within the domain and across providers having similar functions. In one embodiment, natural language processing involves identifying keywords or phrases in the data sets related to such attributes, such as the functionality of the APIs, the location of the APIs, etc. Cognitive analysis involves analyzing the data sets to extract features that are used to differentiate APIs amongst each other as well as to extract features that may be important to API consumer 101 (e.g., features directed to the quality of the API). In one embodiment, the reference pricing is determining based on the APIs within the class or parent node in the taxonomy.

In step 403, API pricing mechanism 102 determines the API price, such as for rate and slabs, dynamically using the identified API consumption parameters and the determined reference pricing. In one embodiment, API pricing mechanism 102 dynamically determines the pricing for rate and slabs based on the following: availability and quality of profile-specific information, functional dimensions (e.g., relevance, granularity, completeness, accuracy, and time of event), non-functional dimensions (e.g., data latency and availability for given data category) and topic (e.g., demographic profile and travel preferences). Furthermore, based on the pricing of the competitor's APIs, the API pricing is determined for rate and slabs that is competitive (i.e., within a threshold amount of difference).

In step 404, API pricing mechanism 102 derives an API pricing score for the determined API price using the supervised learning model of the present invention as discussed in greater detail in connection with FIG. 5.

In step 405, API pricing mechanism 102 dynamically adjusts the API price, such as for the rate and slabs (and discounts if applicable), using the supervised learning model of the present invention by adjusting (continuously adjusts) the weightage given to various API consumption parameters at both the atomic level (e.g., person/organization/product) and/or the aggregated level when the API pricing score is unacceptable (see discussion further below in connection with steps 508-510). For example, the pricing may be determined for the individual API or for a sub-portfolio (e.g., retrieval of account details) of certain APIs based on the data quality benchmarking at the API as well as at the portfolio level.

In one embodiment, the API price may be dynamically adjusted via continuous evaluation of qualitative parameters across dimensions, such as time, category, entity type, etc. The source of such qualitative parameters may be from both structured and unstructured data sources, such as mobile, social media, machine-generated data, etc., where the trust and worthiness of the data may inherently vary across dimensions, such as time, category, etc.

A discussion regarding using the supervised learning model to derive an API pricing score so as to determine a suggested API price is provided below in connection with FIG. 5.

FIG. 5 is a flowchart of a method 500 for deriving an API pricing score so as to determine a suggested API price in accordance with an embodiment of the present invention.

Referring to FIG. 5, in conjunction with FIGS. 1-4, in step 501, API pricing mechanism 102 obtains the historic data pertaining to the acceptance and non-acceptance of the API per price quoted. In one embodiment, such historic data may be stored in a database which is extracted by API pricing mechanism 102 performing queries to extract the pertinent details pertaining to the acceptance and non-acceptance of API per price quoted. An example of a graph showing the historic data for win/loss (i.e., acceptance and non-acceptance) of the API per price quoted is shown in FIG. 6 in accordance with an embodiment of the present invention. Referring to FIG. 6, FIG. 6 illustrates the probability of winning 601 (acceptance of the API by API consumer 101) versus price 602. It appears that the average price quoted for the API is $4; however, it appears that a lower-than-average price does not guarantee acceptance nor does a higher-than-average price guarantee a non-acceptance of the API. There is some uncertainty in the demand for the API.

In one embodiment, such historic data is used for the supervised learning of the pricing function as discussed further below.

In step 502, API pricing mechanism 102 builds a deep learning transfer function using a probability function (e.g., machine learning logistic function) and the obtained historic data.

In one embodiment, an API pricing function is built. Sometime, even API functions from the same customer may contain some inherent amount of uncertainty in the API function-winning probability because the API function-requesting supplier randomly allocates its business to different competitors to ensure a competitive market for future API functions. Because of these practices, an API may never be able to remove all the uncertainty from the API function-price response process and work with probabilistic models.

Let the probability of winning an API function (i.e., having an API consumer 101 accept the API) for a given price P be as follows:

$$\rho(P) \in [0,1] \qquad \text{Eq. 1}$$

such that the function should decrease monotonically as the price increases, and the function should be bounded by zero and one.

A probability function, such as the machine learning logistic function, is used to build a deep learning transfer function. In one embodiment, the inverse S curve probability function is reversed fitted. In one embodiment the probability function utilized is the logistic function that is inverse S-shaped 701 and approaches one and zero at low and high prices, respectively, as shown in FIG. 7 in accordance with an embodiment of the present invention. FIG. 7 is the same graph as shown in FIG. 6 except for the illustration of the logistic function.

From the logistic transformation, one obtains:

$$\rho(P) = \frac{e^{a+b \cdot P}}{1 + e^{a+b \cdot P}} \qquad \text{Eq. 2}$$

where, a and b are parameters that are estimated to fit the historical win/loss data using maximum-likelihood estimates. In one embodiment, parameter values (a, b) are chosen that maximizes the likelihood of the observed values. As a result, the following equation (deep learning transfer function) is maximized:

$$\text{Max } \Sigma_i ((\rho(P_i|a,b)^{W_i} \cdot (1-\rho(P_i|a,b))^{(1-W_i)}) \qquad \text{Eq. 3}$$

where each historical API function opportunity is defined with the subscript i (with $W_i$ representing the indicator response variable, 1=win and 0=loss, and Pi representing the API's price response for the API function opportunity i). Specifically, by using the information on past wins and losses, this model (deep learning transfer function) estimates the probability of winning the API function as a function of the offered price by reverse fitting a probability function.

In step 503, API pricing mechanism 102 builds the API function volatility index. The API function volatility index (AFVI) captures the variation on the probability distribution function. Thus, one obtains:

$$\text{AFVI} = n \cdot \rho(P) \cdot (1 - \rho(P)) \qquad \text{Eq. 4}$$

where n is the number of past API functions by the API.

In step 504, API pricing mechanism 102 builds the profiling table of predictor variables to be used as input to the supervised learning model. In one embodiment, attributes are built into the API profile to be ranked under the predictor variables. These are captured for every transaction which is done along with the API pricing model. All the information is updated in the profiling table for a given contract i as shown in the exemplary profiling table of FIG. 8 in accordance with an embodiment of the present invention.

All the attributes are states as per the ranking meter. These will be exposed as dimensions of the profile which can be used for any aggregation, discernment or congregation logic. Such values for the predictor variables are continuously updated as APIs are accepted or not accepted by API consumers 101.

In step 505, API pricing mechanism 102 builds an API pricing model that predicts the API function probability to rank the API across the API network available for a demand using the probability function, the API function volatility index and the predictor variables in the profiling table.

In one embodiment, all the profile information stored under the predictor variables is used to predict the acceptance of the API. The dependent variable is the API function event of the API, i.e., either the API will participate in an API function or will not participate. Thus, the dependent variable is a dichotomous dependent variable whose value has to be derived from the set of independent predictor variables.

In one embodiment, the logistic regression model is employed which does not assume multinormality and also provides an estimate for the probability of acceptance. The logistic model derives the coefficients of the independent variables to predict default probability of occurrence of a dichotomous dependent variable. Thus, one may want to predict the probability that an API function will be rewarded given the pretext of the predictor variables. This will also have to take into consideration all the API pricing model functionality for a particular contract.

In the context of a win (acceptance) prediction, the technique weighs the predictor variable and creates a probability for each API in order to be classified as either the API function or unqualified. The function in logistic analysis is called the logistic function and can be written as follows:

$$p(Ac_i) = \log\left[\frac{p_i}{1-p_i}\right] = \alpha + \beta_1 X_{i1} + \beta_2 X_{i2} + \ldots + \beta_k X_{ik} = X_i\beta \quad \text{Eq. 5}$$

where,
$p(Ac_i)$ is the probability that the API i will be accepted,
$p_i$ is the probability of winning the API function for i API and k predictor variables.

From the profiling table of FIG. 8 and Eq. 1, one gets:

$$p(Ac_i) = \log\left[\frac{p_i}{1-p_i}\right] = \quad \text{Eq. 6}$$
$$\alpha + \beta_1 \cdot AFVI + \beta_2 \cdot ES + \beta_3 \cdot MA + \beta_4 \cdot Re + \beta_5 \cdot Lat + \beta_6 \cdot Acc +$$
$$\beta_7 \cdot LAM + \beta_8 \cdot BFOS + \beta_9 \cdot CR + \beta_{10} \cdot Disc + \beta_{11} \cdot RR = X_i\beta$$

The coefficients, 1 . . . 11 of the predictor variables $X_1 \ldots X_k$, are estimated by employing the maximum likelihood method.

Eq. 1 can be transformed using the logistic transformation as, $$p(Ac_i) = \frac{e^{(X_i\beta)}}{1 + e^{(X_i\beta)}} \quad \text{Eq. 7}$$

where the value $X_i\beta$ is elaborated by Eq. 2.

In step 506, API pricing mechanism 102 defines the "odds ratio" based on the API function probability to understand the sensitivity of the API function of the API pricing model with changes in the values of the predictor variables in the profiling table. "Sensitivity," as used herein, refers to the correlation of acceptance/non-acceptance of the API based on changes in the values of the predictor variables in the profiling table as shown in FIG. 8.

In modeling the chance of success for an API (acceptance of the API by API consumer 101), a ratio is defined as the odds ratio, such that, $$\theta = \frac{p(Ac_i)}{1 - p(Ac_i)} \quad \text{Eq. 8}$$

In an eventuality, where more importance is given to the API pricing model with higher API efficiency, the value $X_2$: ES would increase by 1. The odds ratio then becomes:

$$\theta_{new} = \theta \cdot e^{\beta_i} \quad \text{Eq. 9}$$

With such a modeling available, the favorability of the API pricing model for each predictor variable $X_i$ is able to be checked. The odds ratio helps one to understand the sensitivity, such as how much a probability of a successful API function increases with a unit decrease in price or unit increase in efficiency scoring or any other predictor variable used in the profiling table.

In step 507, API pricing mechanism 102 derives the API pricing score based on the odds ratio.

In one embodiment, the odds ratio derived in Eq. 4 is used to derive the API score as it congregates all the information used to profile an API in the relevant API demand-supply production frontier.

The API pricing score denoted as $S_{API}$ is computed as the percentage of scores in its frequency distribution that are equal to or lower than it.

$$S_{API} = \frac{c_l + 0.5 f_i}{N} \times 100\% \Big| \{\theta_i \mid i \in (1 \ldots N)\} \quad \text{Eq. 10}$$

where,
$C_l$ is the count of all scores less than the score of interest;
$f_i$ is the frequency of the score of interest;
N is the number of APIs in the consideration; and
$\theta_i$ is the odd ratio for the API i in the consideration.

In step 508, a determination is made by API pricing mechanism 102 as to whether the API pricing score exceeds a threshold value, which may be user-selected.

In one embodiment, the threshold may be dynamically adjusted via continuous evaluation of qualitative parameters across dimensions, such as time, category, entity type, etc. The source of such qualitative parameters may be from both structured and unstructured data sources, such as mobile, social media, machine-generated data, etc., where the trust and worthiness of the data may inherently vary across dimensions, such as time, category, etc.

If the API pricing score does not exceed the threshold value, then, in step 509, API pricing mechanism 102 refines the model weights, such as the weights assigned to the API consumption parameters.

In step 510, API pricing mechanism 102 updates the API pricing model using the refined model weights to rank the API across the API network available for a demand using the probability function, the API function volatility index and the predictor variables in the profiling table as discussed above. API pricing mechanism 102 then defines a new "odds ratio" in step 506.

In connection with the API pricing score not exceeding the threshold value, the pricing is dynamically adjusted in step 404 based on the refined model weights and updated API pricing model. Such an adjusted price will be suggested to be used for the API if the updated API pricing score exceeds the threshold value.

If, however, the API pricing score exceeds the threshold value, then, in step 511, API pricing mechanism 102 determines the suggested price for the API using the API pricing score as illustrated below in connection with FIGS. 9 and 10. In one embodiment, the suggested API price corresponds to the price determined in step 403. Such a price is used if the API pricing score exceeds the threshold value.

FIG. 9 is a table illustrating an example where the pricing model is based on the quality of functional and non-functional parameters of the target API (i.e., the API in question whose suggested pricing is to be determined) relative to referenced APIs providing similar function/data in accordance with an embodiment of the present invention. For example, FIG. 9 shows a set of comparable (possibly competing) APIs related to the retrieval of the asset health status from field equipment deployed by an enterprise, such as in the technical fields of telecommunications, energy, travel, transportation or manufacturing, supply and distribution.

FIG. 10 is a table illustrating an example of comparing the API features between the target API and the referenced APIs in accordance with an embodiment of the present invention.

In one embodiment, the model of the present invention learns and iteratively refines the relative weightage of each parameter based on training and continuous feedback to determine the suggested price of the target API for a given context/consumer as shown below in two exemplary scenarios.

Referring to FIG. 10, concerning scenario 1: First, the business context (e.g., telecommunication) is considered, where the following parameters may have the maximum weightage, and the key feature (KQI) values for these are within the preferred range for the target API.

(a) API Availability (×2)
(b) Granularity—by Location (×4)
(c) Completeness—by Time (×6)

In this scenario, the suggested pricing of the target API is in a favourable range as opposed to the value the consumer is receiving from other providers. For example, the suggested price for the target API is $0.12/call versus $0.09/call; $0.12/call and $0.10/call as the suggested price for reference API 1, 2 and 3, respectively. Since the consumer assessed value of the target API meets or exceeds the consumer assessed value of the referenced APIs, the suggested price for the target API is favourable for the consumer.

Concerning scenario 2: The business context (e.g., transportation) is considered, where the following parameters would typically have the highest weightage, and the key feature (KQI) values for these are not within a favourable range for the target API.

(a) Data Accuracy (×1)
(b) Granularity—by Location (×4)
(c) Latency (×9)

In this scenario, the suggested pricing of the target API is in a less favourable range as opposed to the value the consumer is receiving from other providers. For example, the suggested price for the target API is $0.10/call versus $0.09/call; $0.12/call and $0.10/call as the suggested price for reference API 1, 2 and 3, respectively. Since the consumer assessed value of the target API does not exceed the consumer assessed value for reference API 2, the suggested price for the target API is less favourable for the consumer.

In this manner, an API price is established that reflects the true consumer value of the API. As discussed above, API pricing systems experience the technical problem of utilizing an excessive amount of computing resources (e.g., processing resources) to derive a price to charge for an API that would be acceptable to the API consumer, such as using an excessive amount of computing resources to derive a price to charge for an API based on speculative information. As discussed above, the present invention provides a technological solution to the technical problem by improving the computer capabilities of API pricing systems by reducing the amount of computing resources (e.g., processing resources) utilized by API pricing systems in establishing an API price that is commensurate with the value assessed by the API consumer. Less computing resources need to be utilized since the present invention derives an API price that is commensurate with the value assessed by the API consumer using a probability function (e.g., machine learning logistic function) with the ability to dynamically adjust the API consumption parameters using supervised learning models.

Furthermore, the present invention improves the technology or technical field involving API pricing systems. Currently, such systems price APIs based on expected revenue and the expected number of users and transactions, which are speculative, and may not accurately reflect the true value of the API to the consumer. Furthermore, current models of API pricing charge an upfront amount or recover that amount over a period of time without taking into account where the API stands in terms of the capabilities offered and the quality of data with respect to other similar APIs from other API providers. Hence, the API price may not reflect the true value of the API to the consumer. That is, there is not currently a means for establishing an API price that is commensurate with the value assessed by the API consumer. The present invention addresses such a technical problem by establishing an API price that is commensurate with the value assessed by the API consumer as discussed herein.

The technical solution provided by the present invention cannot be performed in the human mind or by a human using a pen and paper. That is, the technical solution provided by the present invention could not be accomplished in the human mind or by a human using a pen and paper in any reasonable amount of time and with any reasonable expectation of accuracy without the use of a computer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer program product for determining API pricing, the computer program product comprising a non-transitory computer readable storage medium having program code embodied therewith, the program code comprising the programming instructions for:

identifying application programming interface (API) consumption parameters of an API using a supervised learning model, wherein said API consumption parameters comprise attributes, availability, quality of profile-specific information, functional dimensions, non-functional dimensions and topic, wherein said supervised learning model uses machine learning to infer a function based on training data;

determining reference pricing using machine learning using said identified API consumption parameters, wherein said reference pricing comprises competitive pricing;

determining an API price using said identified API consumption parameters and said determined reference pricing;

deriving an API pricing score for said determined API price;

dynamically adjusting said API price by dynamically adjusting said API consumption parameters using said supervised learning model in response to said API pricing score not exceeding a threshold value thereby improving computing capabilities of API pricing systems by lessening computing resources utilized by API pricing systems; and dynamically selecting said API price as a suggested price for said API in response to said API pricing score exceeding said threshold value, wherein said suggested price for said API establishes an API price that is commensurate with a value assessed by an API consumer.

2. The computer program product as recited in claim 1, wherein the program code further comprises the programming instructions for:

obtaining historic data pertaining to acceptance and non-acceptance of API per price quoted; and building a deep learning transfer function using a probability function and said obtained historic data.

3. The computer program product as recited in claim 2, wherein said probability function comprises a machine learning logistic function.

4. The computer program product as recited in claim 2, wherein the program code further comprises the programming instructions for:

building an API function volatility index; and building a profiling table of predictor variables to be used as an input to said supervised learning model.

5. The computer program product as recited in claim 4, wherein the program code further comprises the programming instructions for:

building an API pricing model that predicts an API function probability to rank said API across an API network for a demand using said probability function, said API function volatility index and said predictor variables in said profiling table.

6. The computer program product as recited in claim 5, wherein the program code further comprises the programming instructions for:

defining a ratio based on said API function probability to understand a sensitivity of an API function of said API pricing model with changes in values of said predictor variables in said profiling table.

7. The computer program product as recited in claim 6, wherein the program code further comprises the programming instructions for:

deriving said API pricing score for said determined API price based on said ratio.

8. The computer program product as recited in claim 7, wherein the program code further comprises the programming instructions for:

refining weights assigned to said API consumption parameters in response to said API pricing score not exceeding said threshold value; and updating said API pricing model using said refined weights.

9. A system, comprising:

a memory unit for storing a computer program for determining API pricing; and a processor coupled to the memory unit, wherein the processor is configured to execute the program instructions of the computer program comprising:

identifying application programming interface (API) consumption parameters of an API using a supervised learning model, wherein said API consumption parameters comprise attributes, availability, quality of profile-specific information, functional dimensions, non-functional dimensions and topic, wherein said supervised learning model uses machine learning to infer a function based on training data;

determining reference pricing using machine learning using said identified API consumption parameters, wherein said reference pricing comprises competitive pricing;

determining an API price using said identified API consumption parameters and said determined reference pricing;

deriving an API pricing score for said determined API price;

dynamically adjusting said API price by dynamically adjusting said API consumption parameters using said supervised learning model in response to said API pricing score not exceeding a threshold value thereby improving computing capabilities of API pricing systems by lessening computing resources utilized by API pricing systems; and dynamically selecting said API price as a suggested price for said API in response to said API pricing score exceeding said threshold value, wherein said suggested price for said API establishes an API price that is commensurate with a value assessed by an API consumer.

10. The system as recited in claim 9, wherein the program instructions of the computer program further comprise:

obtaining historic data pertaining to acceptance and non-acceptance of API per price quoted; and building a deep learning transfer function using a probability function and said obtained historic data.

11. The system as recited in claim 10, wherein said probability function comprises a machine learning logistic function.

12. The system as recited in claim 10, wherein the program instructions of the computer program further comprise:

building an API function volatility index; and building a profiling table of predictor variables to be used as an input to said supervised learning model.

13. The system as recited in claim 12, wherein the program instructions of the computer program further comprise:

building an API pricing model that predicts an API function probability to rank said API across an API network for a demand using said probability function, said API function volatility index and said predictor variables in said profiling table.

14. The system as recited in claim 13, wherein the program instructions of the computer program further comprise:

defining a ratio based on said API function probability to understand a sensitivity of an API function of said API pricing model with changes in values of said predictor variables in said profiling table.

15. The system as recited in claim 14, wherein the program instructions of the computer program further comprise:

deriving said API pricing score for said determined API price based on said ratio.

16. The system as recited in claim 15, wherein the program instructions of the computer program further comprise:

refining weights assigned to said API consumption parameters in response to said API pricing score not exceeding said threshold value; and updating said API pricing model using said refined weights.

* * * * *